US011871342B2

(12) United States Patent
Tiwari et al.

(10) Patent No.: US 11,871,342 B2
(45) Date of Patent: Jan. 9, 2024

(54) WIRELESS EVENT NOTIFICATION SYSTEM

(71) Applicant: Carrier Corporation, Palm Beach Gardens, FL (US)

(72) Inventors: Ankit Tiwari, East Hartford, CT (US); Hector Moner Poy, Cork (IE); Michael Ramoutar, Westford, MA (US); Daniele Campana, Cork (IE); Pedro Fernandez Orellana, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 170 days.

(21) Appl. No.: 17/355,477

(22) Filed: Jun. 23, 2021

(65) Prior Publication Data
US 2021/0321328 A1 Oct. 14, 2021

Related U.S. Application Data

(62) Division of application No. 16/493,146, filed as application No. PCT/US2018/022533 on Mar. 15, 2018, now Pat. No. 11,115,922.

(Continued)

(51) Int. Cl.
*H04W 52/02* (2009.01)
*H04L 43/10* (2022.01)

(52) U.S. Cl.
CPC ... *H04W 52/0206* (2013.01); *H04W 52/0216* (2013.01); *H04W 52/0219* (2013.01); *H04W 52/0235* (2013.01); *H04L 43/10* (2013.01)

(58) Field of Classification Search
CPC ......... H04W 52/0206; H04W 52/0216; H04W 52/0235; H04L 43/10
See application file for complete search history.

(56) References Cited

U.S. PATENT DOCUMENTS 5,666,397 A * 9/1997 Lamons ............... H04M 15/30
379/32.02
5,805,056 A 9/1998 Mueller et al.
(Continued)

FOREIGN PATENT DOCUMENTS

CN 203911313 U 10/2014
CN 105933355 A 9/2016
(Continued)

OTHER PUBLICATIONS

International Search Report for International Application No. PCT/US2018/022533; International Filing Date: Mar. 15, 2018; dated Aug. 22, 2018; 7 pages.

(Continued)

*Primary Examiner* — Mohammad S Anwar
(74) *Attorney, Agent, or Firm* — CANTOR COLBURN LLP

(57) ABSTRACT

An event notification system includes a wireless device, an Access Point device, a server, and a user application. The server is configured to receive a plurality of heartbeats from the wireless device and through the Access Point device, and send a heartbeat response of a plurality of heartbeat responses in response to a respective heartbeat of the plurality of heartbeats. The user application is configured to send enable and disable commands to the server. The enable command is sent to the wireless device as part of the next heartbeat response of the plurality of heartbeat responses. The disable command is sent to the wireless device after the server receives an event condition from the wireless device through the AP device.

8 Claims, 10 Drawing Sheets

Related U.S. Application Data

(60) Provisional application No. 62/471,425, filed on Mar. 15, 2017.

(56) References Cited

U.S. PATENT DOCUMENTS

| | | | |
|---|---|---|---|
| 7,113,090 | B1 | 9/2006 | Saylor et al. |
| 7,225,249 | B1 | 5/2007 | Barry et al. |
| 7,852,200 | B2 | 12/2010 | Romanczyk et al. |
| 8,508,355 | B2 | 8/2013 | Pineau et al. |
| 8,937,539 | B2 | 1/2015 | Sharma et al. |
| 8,988,215 | B1 | 3/2015 | Trundle et al. |
| 9,147,337 | B2 | 9/2015 | Cohn et al. |
| 9,449,497 | B2 | 9/2016 | Hyun et al. |
| 9,508,247 | B2 | 11/2016 | Lee et al. |
| 10,536,900 | B2 | 1/2020 | Zhang |
| 11,115,922 | B2 * | 9/2021 | Tiwari ............... H04W 52/0229 |
| 2008/0232288 | A1 | 9/2008 | Venkatachalam et al. |
| 2010/0325642 | A1 | 12/2010 | Paramasivam et al. |
| 2012/0157170 | A1 | 6/2012 | Backholm et al. |
| 2012/0256009 | A1 | 10/2012 | Mucignat et al. |
| 2014/0051364 | A1 | 2/2014 | Simons |
| 2014/0241226 | A1 | 8/2014 | Jia et al. |
| 2014/0280865 | A1 | 9/2014 | Albertson et al. |
| 2014/0320280 | A1 | 10/2014 | Sager et al. |
| 2015/0180543 | A1 | 6/2015 | Verma |
| 2015/0195773 | A1 | 7/2015 | Weng |
| 2015/0363251 | A1 | 12/2015 | Wang |
| 2016/0014772 | A1 | 1/2016 | Suresh et al. |
| 2016/0029346 | A1 | 1/2016 | Suresh et al. |
| 2016/0035196 | A1 | 2/2016 | Chan |
| 2016/0042630 | A1 | 2/2016 | Cho et al. |
| 2016/0105847 | A1 | 4/2016 | Smith et al. |
| 2016/0249281 | A1 | 8/2016 | Sahni |
| 2016/0308971 | A1 | 10/2016 | Sweeney et al. |
| 2016/0351045 | A1 | 12/2016 | Salter |
| 2020/0120598 | A1 | 4/2020 | Tiwari et al. |

FOREIGN PATENT DOCUMENTS

| | | | | |
|---|---|---|---|---|
| EP | 2854022 | A1 * | 4/2015 | ........... G06F 3/1204 |
| WO | 2014144419 | A2 | 9/2014 | |

OTHER PUBLICATIONS

Written Opinion for Application No. PCT/US2018/022533 dated Aug. 22, 2018; 13 pages.

Chinese Office Action Issued in Chinese Application No. 201880032329.2 dated Mar. 28, 2022; 7 Pages.

European Search Report Issued in European Application No. 21184363.6-1205 dated Nov. 22, 2021; 13 Pages.

European Search Report Issued in European Application No. 21184363.6-1205 / 3927027 dated Mar. 24, 2022; 14 Pages.

* cited by examiner

WIRELESS EVENT NOTIFICATION SYSTEM

CROSS REFERENCE TO RELATED APPLICATIONS

This application is a divisional of U.S. Non-Provisional application Ser. No. 16/493,146 filed Sep. 11, 2019, which is a National Stage Application of PCT/US2018/022533 filed Mar. 15, 2018, which claims priority to U.S. Provisional Application No. 62/471,425 filed Mar. 15, 2017, all of which are incorporated herein by reference in their entirety.

BACKGROUND

The present disclosure relates to a wireless communication system and, more particularly, to a wireless event notification system.

Wireless communication systems may include a wireless device, such as an Internet of Things (IoT) device that may be smart and is powered by batteries. Such wireless devices may operate in different energy modes, such as sleep and awake modes to, at least in part, preserve battery life. The wakeup frequency and duration of the wireless device in the different energy modes may not always be optimal in terms of preserving battery life, and may be dependent upon other parameters and/or characteristics of the communication system.

Wi-Fi Power Saving Mode (PSM) is one example of a communication technology utilized by battery powered IoT devices to establish and maintain a Wi-Fi link with an Access Point (AP) device. With Wi-Fi PSM, IoT devices may enter into a sleep state for a predetermined amount of time to save energy after providing notification to the AP device of the IoT device's change in state (i.e., from awake to sleep states). When notified, the AP device may start buffering packets for the sleeping IoT device. The IoT device must awake periodically to check beacons from the AP device that indicate if a buffered packet exists for the IoT device. If a buffered packet does exist, the IoT device retrieves the packet via a Power Save (PS) Poll message.

Unfortunately, IoT devices must awake frequently to monitor the beacons for buffered packages thus expending energy from IoT device batteries. Moreover, the duration that an AP device will buffer a packet (i.e., time before the AP device drops the packet) for an IoT device is limited and manufacturer dependent, thus may be different from one AP device to the next. Therefore, awake periods of the IoT device are typically, conservatively, extended to reduce any chance of a buffered packet being dropped. Yet further, communications with the cloud may introduce unknown latencies, leading to less than optimal system performance. System improvements that preserve the battery life of IoT devices, and/or manage idle time of AP devices are desirable.

As one example, the wireless communication system may be a security system where the IoT devices must communicate periodically with a controller in order to signal their presence and receive commands such as arm and disarm. For a security system to work effectively, this communication should be conducted frequently. Unfortunately, such frequent communications, or responses, consumes considerable energy by the IoT device and shortens battery life.

SUMMARY

An event notification system according to one, non-limiting, embodiment of the present disclosure includes a wireless device including a sensor for detecting an event; an Access Point (AP) device; a controller configured to receive a plurality of heartbeats from the wireless device and through the AP device, and send a heartbeat response of a plurality of heartbeat responses to a respective heartbeat of the plurality of heartbeats; and a user application configured to send sensor enable and disable commands to the controller, wherein the sensor enable command is sent to the wireless device as part of the next heartbeat response of the plurality of heartbeat responses, and the sensor disable command is sent to the wireless device after the controller receives an event condition from the wireless device through the AP device.

Additionally to the foregoing embodiment, the event notification system is a security system, the sensor enable command is an arm command, and the sensor disable command is a disarm command.

In the alternative or additionally thereto, in the foregoing embodiment, the controller is at least part of a cloud server.

In the alternative or additionally thereto, in the foregoing embodiment, the cloud server includes a virtual security panel.

In the alternative or additionally thereto, in the foregoing embodiment, the user application is a mobile application.

In the alternative or additionally thereto, in the foregoing embodiment, the wireless device is a Power Save Mode (PSM) device.

In the alternative or additionally thereto, in the foregoing embodiment, the controller is configured to send a disabled response to the user application in response to receiving the disable command and without sending the disable command to the wireless device via the AP device.

In the alternative or additionally thereto, in the foregoing embodiment, the controller is configured to buffer the disable command and suppress the event condition prior to the controller sending the disable command to the wireless device after receipt of the event condition.

In the alternative or additionally thereto, in the foregoing embodiment, the controller is configured to buffer the enable command prior to the controller sending the enable command to the wireless device via the next heartbeat response.

In the alternative or additionally thereto, in the foregoing embodiment, the wireless device includes a plurality of awake states intervened by a plurality of sleep states, and each heartbeat of the plurality of heartbeats are sent during a respective awake state of the plurality of awake states.

In the alternative or additionally thereto, in the foregoing embodiment, the event notification system is a non-beacon-tracking security system.

A method of operating an event notification system according to another, non-limiting, embodiment includes sending a disable command from a user application to a controller; sending an effective disabled response from the controller to the user application in response to the disable command; and buffering the disable command by the controller.

Additionally to the foregoing embodiment, the controller is a virtual panel that is part of a cloud server.

In the alternative or additionally thereto, in the foregoing embodiment, the method includes sending an event condition from a Power Save Mode (PSM) device, through an Access Point (AP) device, and to the controller; suppressing the event condition at the controller while the disable command is buffered; and sending the buffered disable command from the controller, through the AP device, and to the PSM device in response to receipt of the event condition.

In the alternative or additionally thereto, in the foregoing embodiment, the method includes sending an enable command from the user application to the controller; buffering the enable command by the controller; sending a heartbeat from the PSM device, through the AP device, and to the controller; sending a heartbeat response from the controller, through the AP device, and to the PSM device, wherein the heartbeat response includes the enable command and is in response to the heartbeat.

In the alternative or additionally thereto, in the foregoing embodiment, the method includes enabling the PSM device after receiving the heartbeat response; and sending an enabled confirmation signal from the PSM device, through the controller, and to the user application.

In the alternative or additionally thereto, in the foregoing embodiment, the AP device is a router.

In the alternative or additionally thereto, in the foregoing embodiment, the user application is a smart phone.

In the alternative or additionally thereto, in the foregoing embodiment, the event notification system is a security system, enable command is an arm command, and the disable command is a disarm command.

An event notification system according to another, non-limiting, embodiment includes a wireless device including a sensor for detecting an event; a gateway device; a controller configured to send commands to the wireless device and through the gateway device; and a user application configured to send sensor enable and disable commands to the controller, wherein the sensor enable command is sent to the wireless device through the gateway within periodic awake intervals of the wireless device, and the sensor disable command is sent to the wireless device within periodic awake intervals of the wireless device or after the controller receives an event condition from the wireless device through the gateway.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
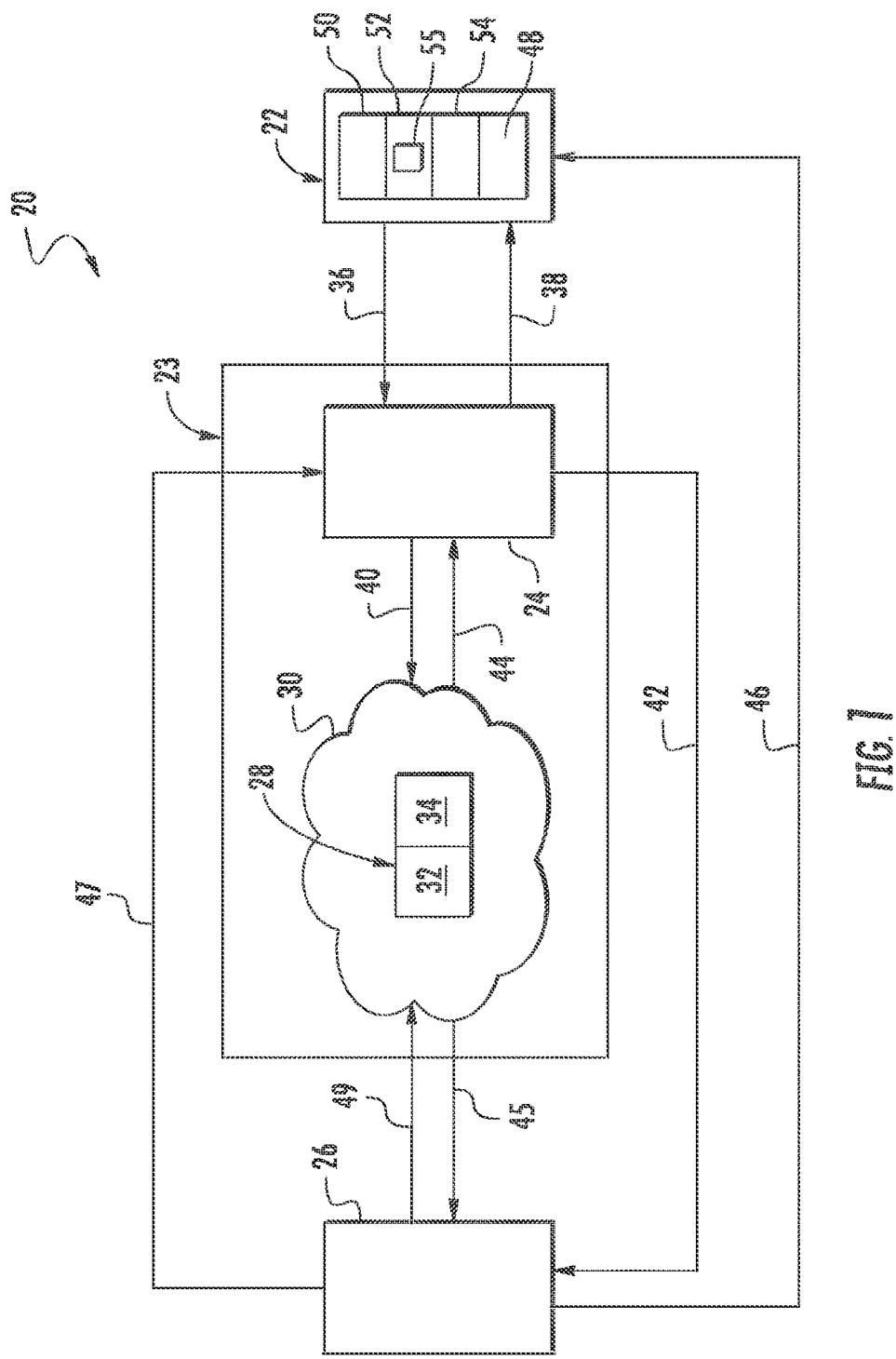
FIG. 1 is a schematic of a wireless communication system as one, non-limiting, exemplary embodiment of the present disclosure.

Referring to FIG. 1, an exemplary embodiment of a wireless communication system 20 is illustrated. The wireless communication system 20 may include a wireless device 22, a control assembly 23, and a user application 26 that may be a mobile application. The control assembly 23 may include a gateway or Access Point (AP) device 24 and a controller 28. The controller 28 may be a server, and may be, or is part of, a cloud 30. The controller 28 may include a computing processor 32 and a storage medium 34. The wireless device 22 may be configured to communicate with the AP device 24 over a wireless pathway (see arrow 36). The AP device 24 may be configured to communicate with the wireless device 22, the controller 28, and/or the mobile application 26 over respective pathways (see arrows 38, 40, 42) that may be wireless pathways. The cloud 30, and/or controller 28, may be configured to communicate with the AP device 24 over a pathway (see arrow 44) that may be wireless, and the mobile application 26 over a pathway (see arrow 45) that may be wireless. The mobile application 26 may be configured to communicate with the wireless device 22 over a pathway 46 that may be wireless, communicate with the AP device 24 over a wireless pathway (see arrow 47), and/or communicate with the controller 28 over a pathway (see arrow 49) that may be wireless. In one example, the mobile application 26 may directly connect to the cloud 30 via a third generation of mobile telecommunications technology (i.e., 3G), or indirectly through the AP device 24 (i.e., Home Wi-Fi).

The AP device 24 may be a router having firmware that supports Wi-Fi Power Save Mode (PSM). The mobile application 26 may be a smart phone, a digital media player, a tablet computer, and other applications. Examples of a wireless device 22 may include smart home sensors or intrusion sensors of a security system configured to detect the opening of windows or doors, Passive Infrared (PIR) sensors, image sensors (i.e., PIR sensor with camera), thermal sensors of a heating system configured to measure the temperature of ambient air, gas sensors configured to detect the presence of gases, smoke detectors as part of a safety system, and many other types of devices utilizing batteries and communicating wirelessly.

The wireless device 22 may further be a smart device, an Internet of Things (IoT) device, and/or a Wi-Fi PSM device configured to communicate with the cloud 30 through the AP device 24. The wireless device 22 may include a power management module 48 (i.e., battery and a means of managing battery power), a sensor and/or actuator 50, a computing processor 52 (e.g., microcontroller), and a wireless transceiver 54. As a PSM device, the wireless device 22 is configured to enter into sleep and awake states at a predetermined frequency and duration of time.

In one embodiment and when in a sleep state, internal timer(s) 55 of the processor 52 of the wireless device 22 may remain powered, but all other components of the wireless device 22 are generally turned off. The wireless device 22 may awake from the sleep state when a pre-specified awake time occurs, or when an enabled interrupt is triggered (i.e., an event sensed by the sensor 50 occurs). Generally, maximizing the sleep state durations and/or reducing or eliminating the need to track AP beacons, optimizes battery life. In one example, the preferred life for a battery of a low power IoT device is about four to five years.

The wireless communication system 20 eliminates the need for more traditional tracking of beacons broadcasted by the AP device 24 to the wireless device 22, and thereby may maximize the standby time (i.e., sleep state duration) of the wireless device 22. Beacons do not need to be tracked for receiving a buffered packet from the AP device 24, since a Power Save (PS) poll (i.e., PS poll signal) may be sent straight away from the wireless device 22 to the AP device 24. The AP device 24 may reply to the PS poll with an Acknowledgement (ACK), (i.e., acknowledgement signal) followed by a buffered packet if a signal or data has been buffered by the AP device 24 for retrieval by the wireless device 22, or directly with the buffered packets. If there is no packet buffered, the response is a no-data packet, or the ACK followed by the no-data packet. In the event that a no-data packet is received by the wireless device 22, the wireless device 22 may return to a sleep state. If no packet is received by the wireless device 22, the wireless device may return to a sleep state after a pre-specified duration of the awake state has expired (i.e., timed-out). After another pre-specified duration in a sleep state, the wireless device 22 will wake up again and send a PS poll to retrieve the buffered packet as previously described. The process will repeat until a data packet is received, or a pre-specified counter reaches its limit.

PSM Device Initiated, Non-Beacon-Tracking, Wireless, Communication System

Figure 2:
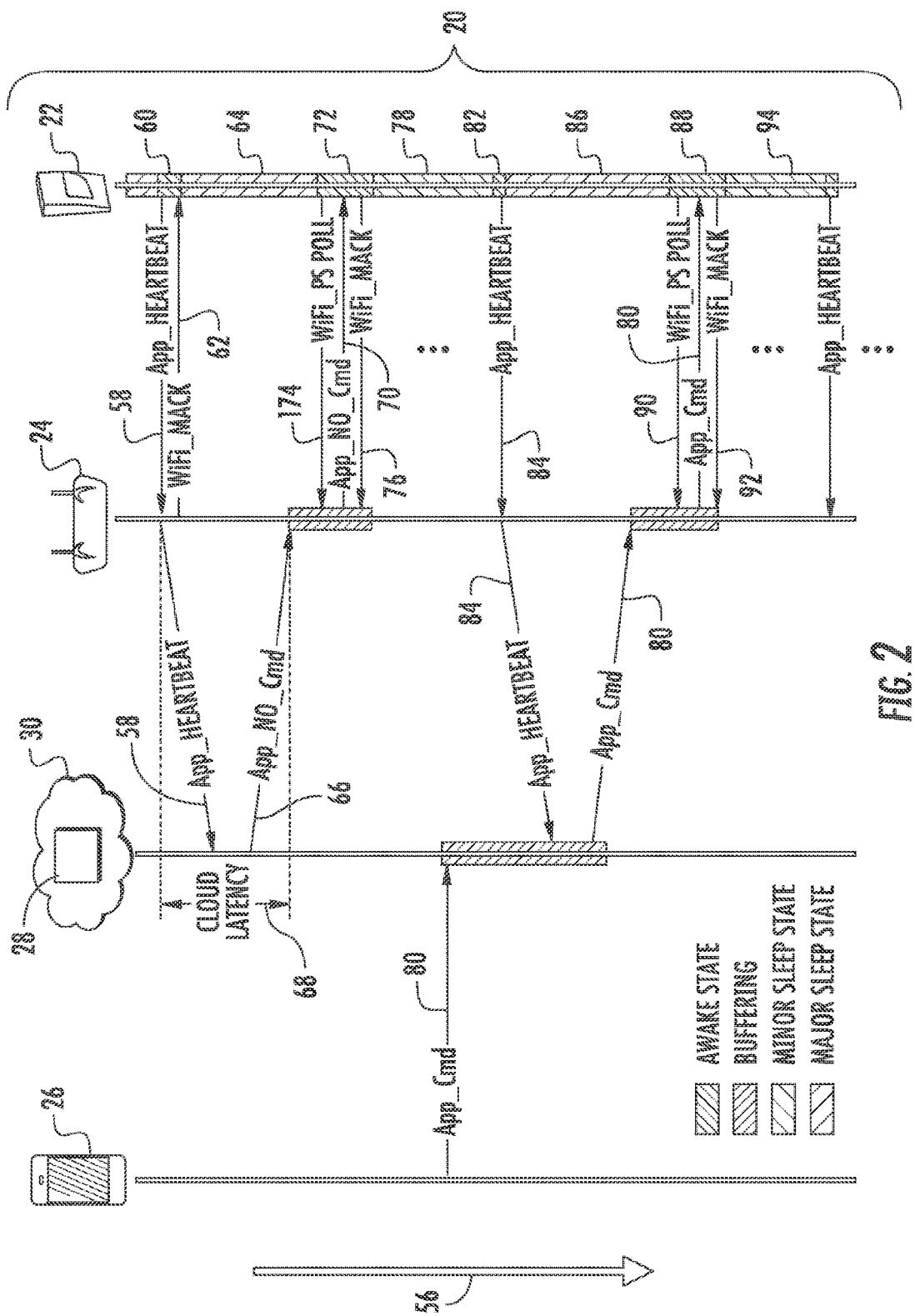
FIG. 2 is a schematic of a "PSM device initiated, non-beacon-tracking, wireless, communication system" as one embodiment of the wireless communication system, and that illustrates a method of retrieving buffered packets.

Referring to FIG. 2, a schematic generally outlining communications between the wireless device 22, the AP device 24, the server 28 (i.e., and/or cloud 30), and the mobile application 26 along a timeline (see arrow 56) is illustrated. This particular string of communications generally depicts a process wherein the wireless device 22 initiates Wi-Fi PSM without requiring the wireless device 22 to track beacons broadcasted by the AP device 24. That is, the wireless device 22 is configured to ignore the beacons broadcasted by the AP device 24.

More specifically, the wireless device 22 of the communication system 20 may send a first request 58 (i.e., heartbeat or request signal) through the AP device 24 and to the server 28 when in a first awake state 60 (i.e., the PSM). Upon receiving the first request 58, the AP device 24 may send an acknowledgement (ACK) 62 to the wireless device 22. The ACK 62 may be a Wi-Fi ACK at a MAC level. After receiving the ACK 62, the wireless device 22 may enter into a minor sleep state 64. The minor sleep state 64 has a conservative duration that is longer than an uplink latency (see arrow 68), but may be shorter than the summation of the uplink latency 68 plus a buffer timeout duration. In one embodiment, the minor sleep state 64 duration may be shorter than the buffer timeout duration.

In one embodiment, and generally while the wireless device 22 is in the minor sleep state 64, the server 28 may receive the first request 58 from the AP device 24 and send a first response 66 to the AP device 24. In general, the uplink latency 68 may be measured from the time that the AP device 24 receives the first request 58 to the time that the AP device 24 receives the first response 66. It is understood that the first response 66 may not contain any command language, or command data, and may instead be an empty packet, a registration request, information on status, and/or other related responses. In one embodiment, the uplink latency 68 may be less than the duration of the summation of the first awake state 60 plus the duration of the minor sleep state 64.

The first response 66 may be buffered by the AP device 24, and thus awaits retrieval by the wireless device 22 as a data packet 70 (i.e., buffered packet). Because the minor sleep state 64 duration is generally less than the summation of the uplink latency 68 and the AP buffer timeout duration, the data packet 70 will not be dropped by the AP device 24. Unlike other data packets to be described below, data packet 70 may not contain a command from the mobile device 26, and instead may contain information such as registration information, status information, and the like.

From the minor sleep state 64, the wireless device 22 may enter into a second awake state 72. When in the second awake state 72, the wireless device 22 may send a first Power Save (PS) poll 74 to the AP device 24. In response to the first PS poll 74, the AP device 24 may send the buffered data packet 70 to the wireless device 22. After receiving the data packet 70, the wireless device 22 may send an ACK 76 to the AP device 24, and then enter into a major sleep state 78.

The major sleep state 78 duration may be as long as reasonably possible, but shorter than an idle time of the AP device 24 to prevent disassociation of the AP device 24 from the wireless device 22. The duration of the major sleep state 78 is considerably longer than the duration of the minor sleep state 64, and thus facilitates a reduction in energy consumption of the wireless device 22. In one embodiment, the duration of the minor sleep state 64 may be about one (1) second, and the duration of the major sleep state 78 may be about fifty (50) seconds. Moreover, the major sleep state 78 may be more energy efficient than the minor sleep state 64 because in the minor sleep state 64 only the transceiver and some additional hardware may be switched off. In the major sleep state 78, the transceiver, various hardware, the processor (e.g., CPU), and some voltage regulators may be switched off. That is, for the major sleep state 78, only a real time counter or oscillator may remain on to trigger an interrupt to awake the processor.

In one embodiment, receipt of the first data packet 70 enables the wireless device 22 to determine if further actions need to be performed, for example, a command to take a picture. More specifically, the data packet 70 may contain a command that requires processing by the wireless device 22, and execution of the command that may entail sending a command response (not shown), from the wireless device, through the AP device 24, and to the server 28. It is further understood that the ACK 76 (i.e., or the ACK part of the data packet 70) functions to indicate if there are multiple packets to be retrieved. If there are multiple packets, multiple PS polls would be sent until all of the buffered packets are retrieved.

It is contemplated and understood that prior to receipt and buffering of the data packet 70 by the AP device 24, and thus prior to the second awake state 72, the wireless device 22 may awake and send at least one PS poll (not shown in FIG. 2) that is acknowledged by the AP device 24, and wherein the AP device 24 then sends a no-data packet (not shown) to the wireless device 24. The no-data packet is originated by the AP device 24 as a result of the associated PS poll and not having any buffered packet for the wireless device 22, and is therefore not buffered by the AP device. Upon receipt of the no-data packet by the wireless device 22, the wireless device may return to a sleep state until the next PS poll.

The server 28 may be configured to receive command signals 80 from the mobile application 26. In one example, the command signal 80 may be associated with a learned buffer timeout duration to be discussed further below. Once received, the server 28 may buffer the command signal 80, while awaiting retrieval by the wireless device 22 through the AP device 24. Generally, it is understood that the buffer timeout duration of a cloud server may be substantially longer than the buffer timeout duration of the AP device 24, which may be manufacturer dependent.

While the command signal 80 is buffered by the server 28, the wireless device 22 may enter into a third awake state 82 from the second sleep state 78. While in the third awake state 82, the wireless device 22 may send a second request 84, through the AP device 24, and to the server 28. After sending the second request 84, the wireless device 22 may enter into a second minor sleep state 86. The second request 84 may generally be an inquiry for data or commands from the cloud. In the present example, the second request 84 enacts retrieval of the command signal 80 from the server 28 for buffering at the AP device 24. That is, in response to the second request 84, the server 28 forwards the command signal 80 to the AP device 24, where the command signal 80 is, again, buffered as a data, or command, packet.

While the command signal 80 may be buffered by the AP device 24, the wireless device 22 may enter into a fourth awake state 88 from the second minor sleep state 86. While in the fourth awake state 88, the wireless device 22 may send a second PS poll 90 to the AP device 24. In response to the second PS poll 90, the AP device 24 may send the data packet associated with the command signal 80 to the wireless device 22. Upon receipt of the data packet, the wireless device 22 may send an ACK 92 to the AP device 24, may perform an action in accordance with the data packet, and may then enter into a second major sleep state 94. It is understood that the process of retrieving data packets from the cloud 30 via cloud requests and AP polling of the AP device 24 may generally repeat itself during normal operation. Such requests and polling may eliminate any need for more traditional tracking of beacons, thus enhancing operation of the power management module 48 and preserving battery life.

Generally, the present disclosure takes into account time related traits such as an uplink latency 68, a buffer timeout duration of the AP device 24, and an idle time of the AP device 24. The uplink latency 68 may generally be the time it takes the cloud 30 to respond to a request, or heartbeat, from the wireless device 22. More specifically, uplink latency 68 is the duration measured from the time that the heartbeat leaves the AP device 24 to the time that a response is received by the AP device. Once the response is received by the AP device 24 it may be buffered and generally becomes a packet that may, or may not, contain a command or other data. The time it takes the wireless device 22 to retrieve the buffered packet is not typically part of the uplink latency period.

Advantages and benefits of the non-beacon-tracking, wireless, communication system 20 include a reduction in the energy consumption of wireless devices 22 by avoiding the need to track AP beacons by the wireless device 22, and maximizing the time the wireless device may stay in a sleep mode without losing packets at the AP device. The method of operating the system 20 may be applied to legacy AP devices, and may be more efficient than legacy Wi-Fi PSM protocol when the wireless device is certain that the AP device is buffering a packet for the wireless device. This may be true for wireless devices that stay in a sleep state for most of the time, since periodic heartbeats may be exchanged between the cloud and the devices. The present method may assist the wireless device 22 in maximizing the major sleep state duration according to idle time capability, and optimize the minor sleep state duration according to cloud latency and buffer capability of the AP device 24, which may make the device more energy efficient.

Event Notification System and Method of Smart Enabling/Disabling IoT Devices

Figure 3:
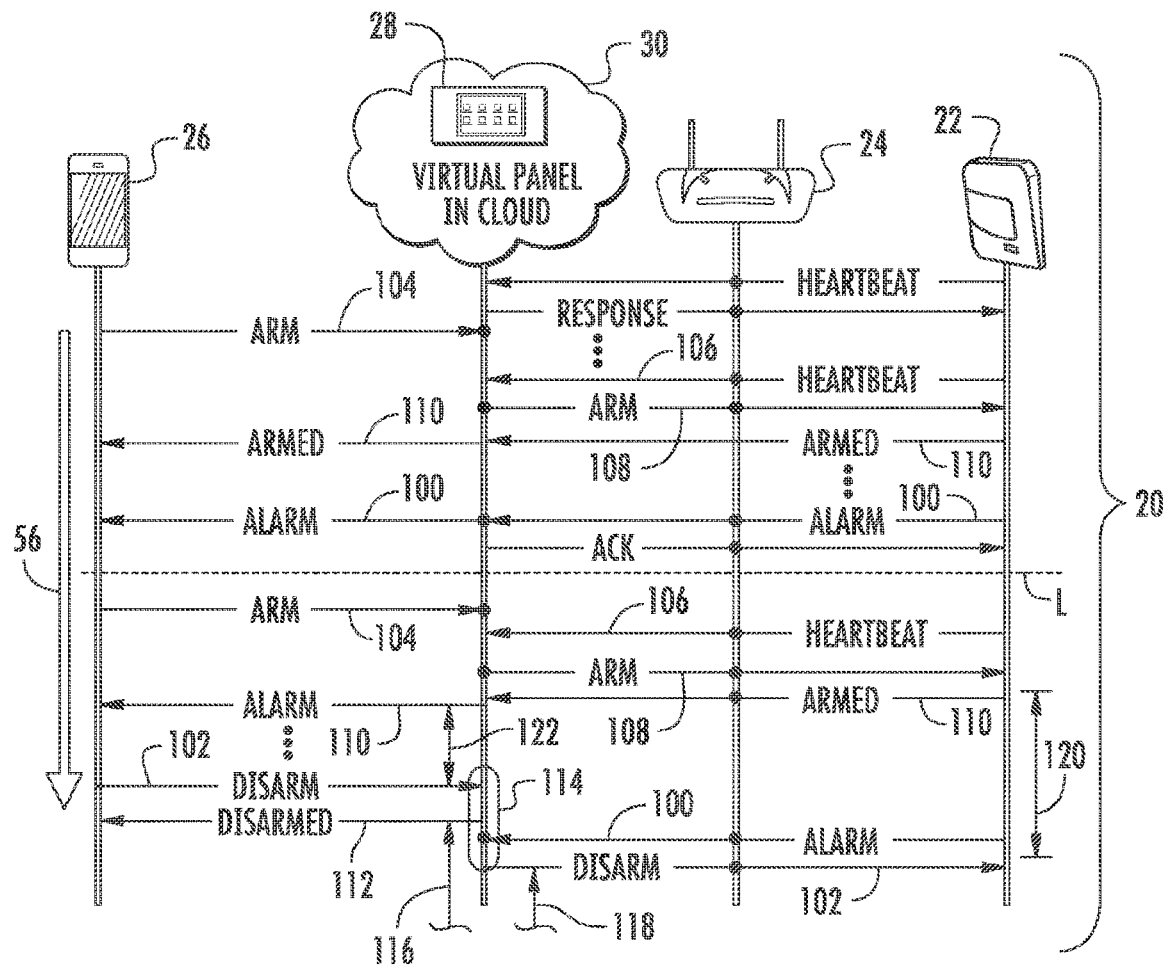
FIG. 3 is a schematic of an event notification system as one, non-limiting, example of the wireless communication system, and illustrates two scenarios depicting methods of enabling and disabling a wireless device of the system.

Referring to FIG. 3, one example, or application, of the wireless communication system 20 may be an event notification system. FIG. 3 generally illustrates two separate operating scenarios of the same event notification systems, such as security system. The first scenario located above the dotted line L depicts a scenario where an event condition 100 is triggered while an event detection and notification function of the sensor 50 of the wireless device 22 is enabled. The second scenario located below the dotted line L depicts a scenario where an event detection and notification function disable command 102 is sent to a server 28 (e.g., virtual panel) and is then followed by the event condition 100. Non-limiting examples of the event notification system 20 may include a security system, a fire detection system, or any alarm/notification system triggered by sensed events. In the example of a security system, the system may be associated with an alarm condition as one example of the event condition 100. For the same embodiment, the function disable command 102 for the security system 20 may be a disarm command, and an enable command 104 may be an arm command.

The event notification system 20 facilitates a smart, function enable/disable method for the battery-powered, wireless, devices 22. In general, the event notification system 20 may be applicable to any security IoT devices that sleep for relatively long time intervals. That is, the applicable event notification system 20 may be any wireless event notification system with nodes that enter into a sleep state to save energy. Two, non-limiting, examples of such a system 20 are the "PSM device initiated, non-beacon-tracking, wireless, communication system" described above, and the "Server initiated, non-beacon-tracking, wireless, communication system" described herein.

The event notification system 20 may be a panel-less security system with distributed wireless devices 22 (e.g., PSM devices) with at least some of the wireless devices 22 configured to periodically sleep to conserve energy. Each wireless device 22 (i.e., or sensor 50 of the wireless device 22) may generally maintain an enabled status and an actual disabled status, locally. Additionally, the enabled status and the disabled status may also be maintained by a central controller 28. The controller 28 may be part of a server that may be part of the cloud 30. Moreover, the controller 28 may generally be a virtual panel in the cloud 30. In the embodiment of a wireless security system 20, the enabled status may be an armed status, and the actual disabled status may be an actual disarmed status.

For simplicity of explanation, the event notification system 20 will be further described in terms of the security system embodiment. In operation, when a user, through a user application 26 (e.g., mobile application), arms or disarms the security system 20 (i.e., one or more sensors 50 of wireless devices 22), associated arm and disarm commands 102, 104 are sent to the virtual panel 28 in the cloud 30. The cloud 30 then sends the commands 102, 104 to individual wireless devices 22 based on the wireless device wakeup schedules or in response to a message received from the wireless device 22.

Figure 4:
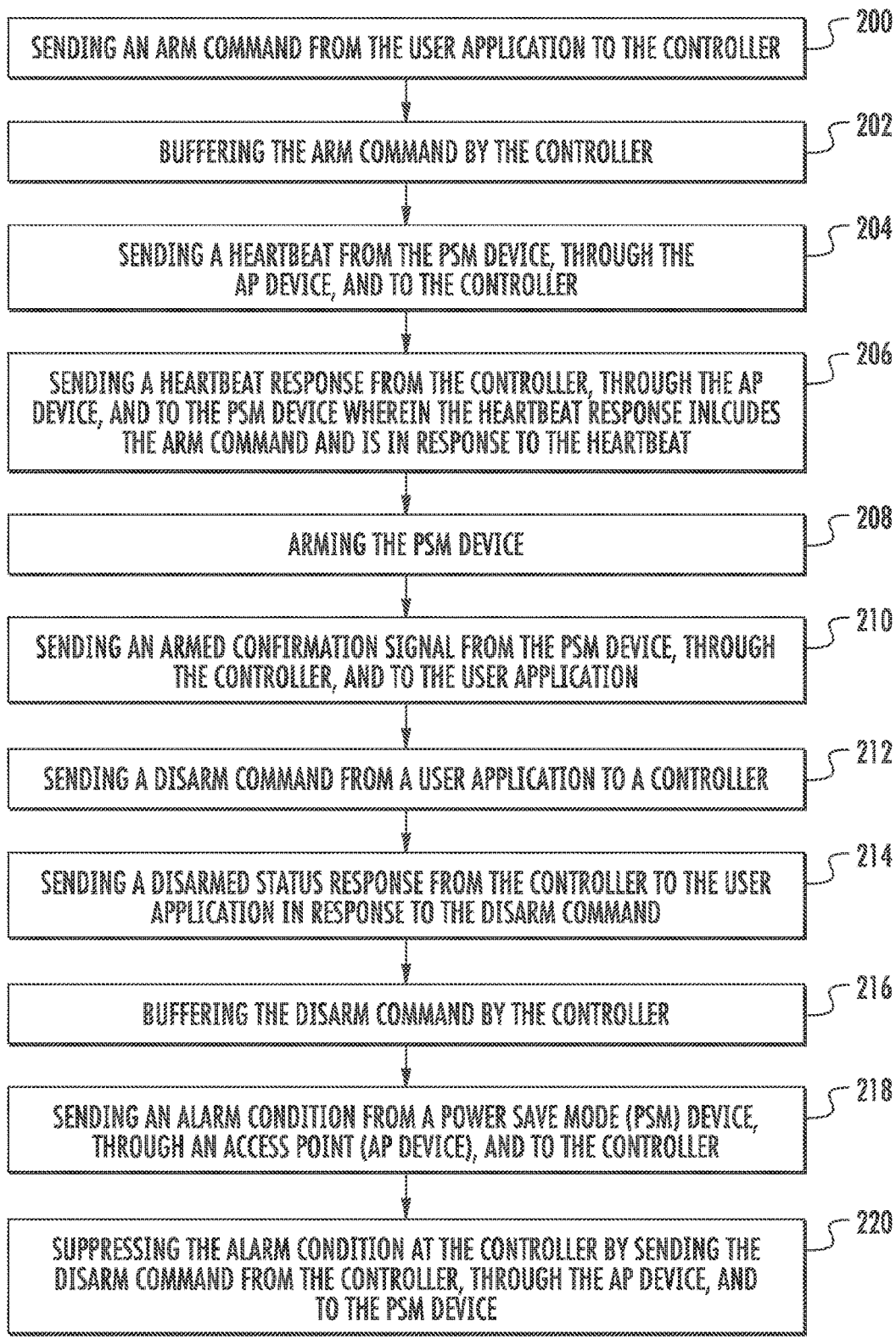
FIG. 4 is a flowchart of the method illustrated in FIG. 3.

Referring to FIGS. 3 and 4, a method of arming and disarming the wireless devices 22 of the wireless security system 20 is illustrated. At block 200, the arm command 104 may be sent from the user application 26 and to the controller 28. At block 202, the arm command 104 may be buffered by the controller 28. At block 204, a heartbeat 106 may be sent from the wireless device 22, through the AP device 24, and to the controller 28. At block 206, a heartbeat response 108 may be sent from the controller 28, through the AP device 24, and to the wireless device 22. The heartbeat response 108 may include the arm command 104 that may originate from the user application 26.

At block 208, the computing processor 52 of the wireless device 22 may arm the sensor 50 of the wireless device 22 as a result of receiving the arm command 104 via the heartbeat response 108. At block 210, an armed confirmation signal 110 may be sent from the wireless device 22, through the controller 28, and to the user application 26. Although not illustrated, it is contemplated and understood that various ACK's may be sent between the AP device 24 and the wireless device 22 as is known by one skilled in the art.

At block 212 and generally at any time (see arrow 56), the disarm command 102 may be initiated or entered by a user into the user application 26. The user application 26 may then send the disarm command 102 to the controller 28 regardless of whether the wireless device 22 is in a sleep state or an awake state. At block 214, the controller 28 may send a disarmed status response 112 to the user application 26 in response to the disarm command 102, thereby notifying the user of the disarmed status. More specifically, the security system 20 is in an "effective" disarm status (see arrow 116), but the wireless device 22 is not yet in an "actual" disarm state or status (see arrow 118). Accordingly, an "actual" alarm status (see arrow 120) of the wireless device 22 may be longer than an "effective" alarm status (see arrow 122) of the security system 20 by an amount of time generally equivalent to a buffer interval 114.

At block 216, the disarm command 102 may be buffered (i.e., see buffer interval 114 in FIG. 3) by the controller 28. It is contemplated and understood that the buffering begins immediately upon receipt of the disarm command 102, thus the command may be buffered while the disarmed status response 112 is sent. Furthermore, the disarm command 102 may be buffered regardless of whether the wireless device 22 is in the sleep state or in the awake state. In one embodiment, if a heartbeat is received from the wireless device 22 during the buffer interval 114, the disarm command 102 may be integrated into a heartbeat response to the wireless device 22. At which point, the wireless device 22 will be disarmed. The buffer interval 114, therefore depends on what occurs first, an alarm or a heartbeat.

At block 218, a sensed event may occur at the wireless device 22 (i.e., before a heartbeat is sent), and the subsequent alarm condition 100 may be sent from the wireless device 22, through the AP device 24, and to the controller 28. It is generally understood that block 218 may occur if the wireless device 22 is armed even though the disarm command 102 is being buffered, and an alarm occurs before the wireless device 22 sends a heartbeat to retrieve the disarm command 102 in the cloud 30. In one scenario, a heartbeat may be sent before the alarm/event happens, then the system is disarmed and any sensing of the event will not occur.

At block 220 and once the alarm condition 100 is received by the controller 28, the controller may check the status of the system (i.e., armed or disarmed). If the system is disarmed, the controller 28 may discard the alarm and send a disarm command to the wireless device 22 to synchronize the status. This occurs if the alarm command 100 is received and the cloud 30 is in a disarm state. That is, the buffering of the disarm command 102 generally ceases and the alarm condition 100 is generally suppressed. It is contemplated and understood that the wireless device 22 may generally receive the disarm command 102 immediately after sending the alarm condition 100, and need not wait for the next heartbeat response. In this way, the responsiveness of the security system 20 is not hindered.

Although not specifically illustrated, the wireless devices 22 may be associated with line-powered devices. For example, a line-powered device may be an audible alarm device that is hardwired to receive power. The line-powered device may directly communicate with the wireless device and the controller 28 over pathways that may be wireless or hardwired.

Advantages and benefits of the security system 20 includes a method for arming and disarming wireless devices directly, which eliminates the need for an on-premises hub or panel. Moreover, the system maintains the same user experience for disarming battery-powered devices that do not need to wakeup periodically for receiving disarm commands. Other advantages include a method for automatic disarming that may not require external devices to track user or object locations, may not add or require extra communication load due to message exchanges, and may maintain similar cost and overall system energy savings.

Figure 5:
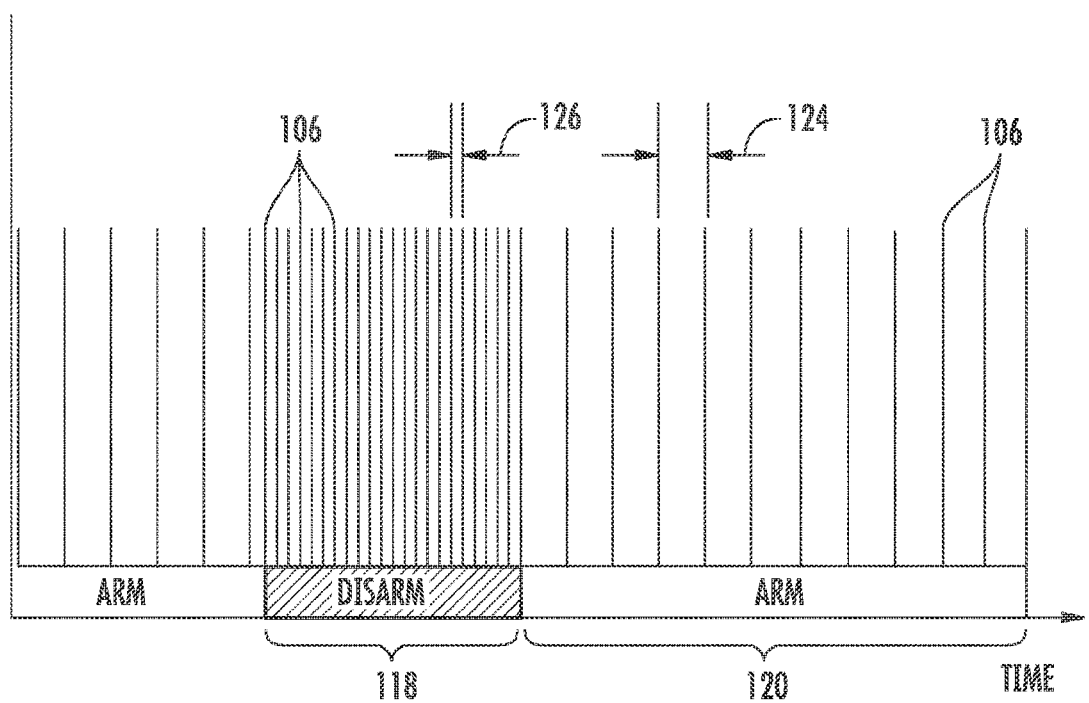
FIG. 5 is a chart illustrating a frequency of wakeup intervals as a function of armed and disarmed status.

An Event Notification System with Dynamically Configurable Frequencies of Communication Referring to FIGS. 3 and 5, the event notification system 20 (e.g., security system) may be configured to dynamically adapt the wakeup interval of the wireless device(s) 22. One embodiment of dynamically configurable frequencies of communication may depend upon the arming state of the system. For example, the wireless device 22 may send a multitude of heartbeats 106 to the AP device 24 at a first heartbeat frequency, or rate, when the system 20 is in the "actual" disarmed status 118, and at a second heartbeat frequency when the system 20 is in the "actual" armed status 120. In order to improve operating efficiently of the wireless device 22 (i.e., improve responsiveness and/or reduce energy consumption), the first frequency may be greater than the second frequency. More specifically, a duration (see arrow 124) of each successive sleep state when the wireless device is in the "actual" armed status 120 is greater than a duration (see arrow 126) of each successive sleep state when the wireless device 22 is in the "actual" disarmed status 118. Moreover, the duration of the "actual" arm status 120 may be generally equal to the duration of the "effective" arm status 122 plus the buffer interval 114 that finishes when an alarm or heartbeat is received. It is contemplated and understood that the term "heartbeat" may include any communication between the wireless device 22 and the control assembly 23 (see FIG. 1).

In one embodiment, the wireless device 22 may be a smart device and may be programmed to increase the frequency of heartbeats 106 when the device 22 receives the disarm command 112. In another embodiment, the controller 28 may include instructions to the wireless device 22 as part of the disarm command 112, and which facilitate the change in heartbeat frequency. The frequency of heartbeats relative to arm and disarm status may be configurable from the cloud 30.

In one embodiment and as previously described, the controller 28 may be configured to buffer (see buffer interval 114 in FIG. 3) the disarm command 102 prior to the controller 28 sending the disarm command 102 to the wireless device 22 via the next heartbeat response 108 or in direct response (i.e. disarm command 102) to an alarm 102.

Figure 6:
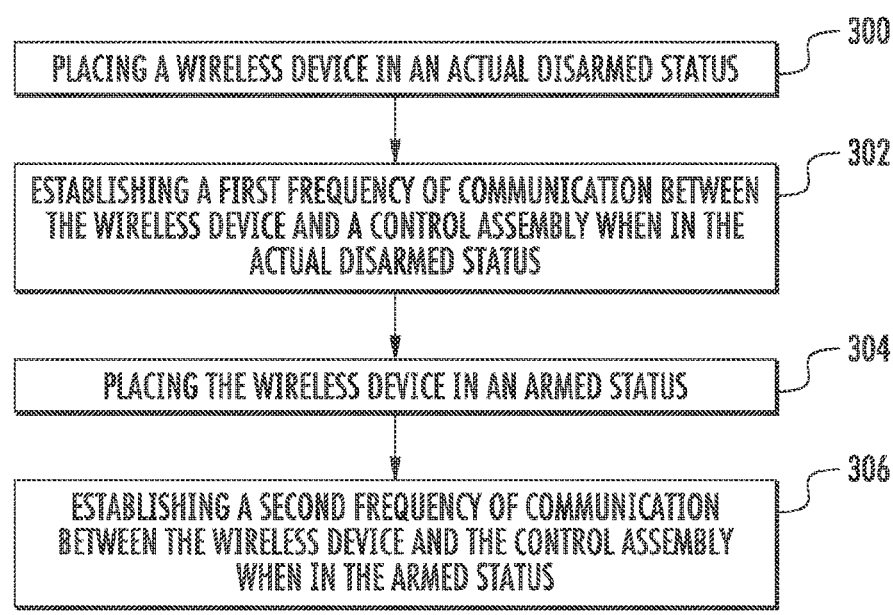
FIG. 6 is a flowchart of a method of operating the system and reflective of the chart illustrated in FIG. 5.

Referring to FIG. 6, a method of operating the security system 20 includes in block 300 the placement of the wireless device in the disarmed status 118. At block 302, a first frequency of communication between the wireless device 22 and the control assembly 23 is established when the wireless device converts to, and is in, the "actual" disarmed status 118. At block 304, the wireless device may be placed in the "actual" armed status 120. At block 306, a second frequency of communication between the wireless device 22 and the control assembly 23 is established when the wireless device 22 converts to, and is in, the "actual" armed status 120. It is contemplated and understood that the wireless device 22 may communicate with the control assembly 23 at the second frequency during the buffer interval 114.

Figure 7:
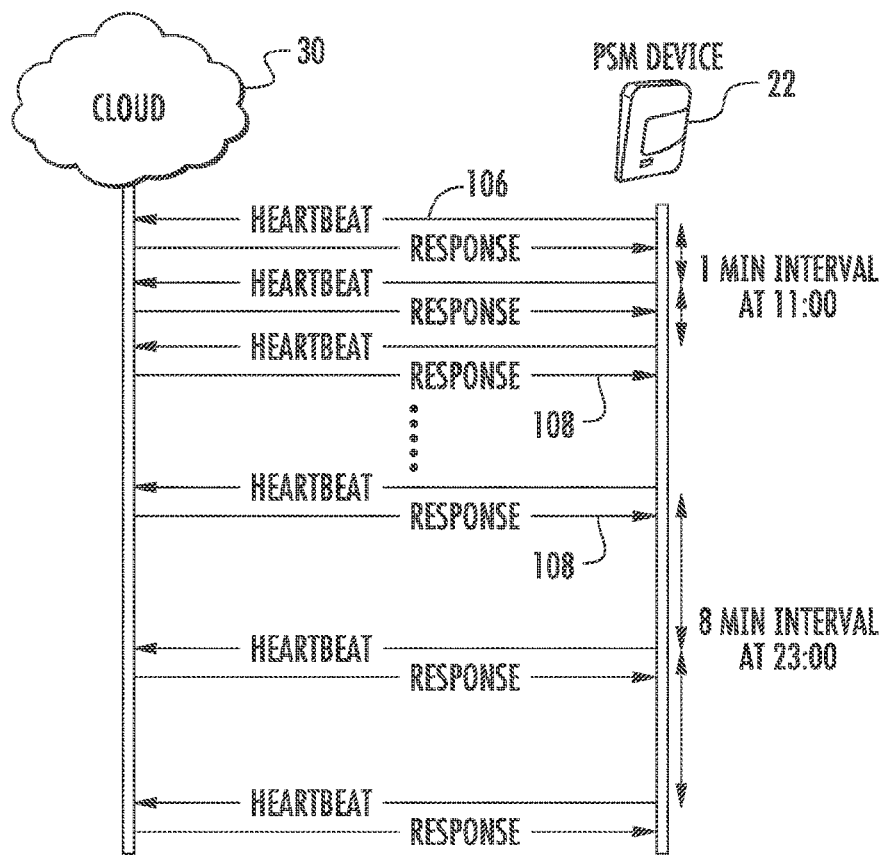
FIG. 7 is a schematic of a second embodiment of the event notification system.
Figure 8:
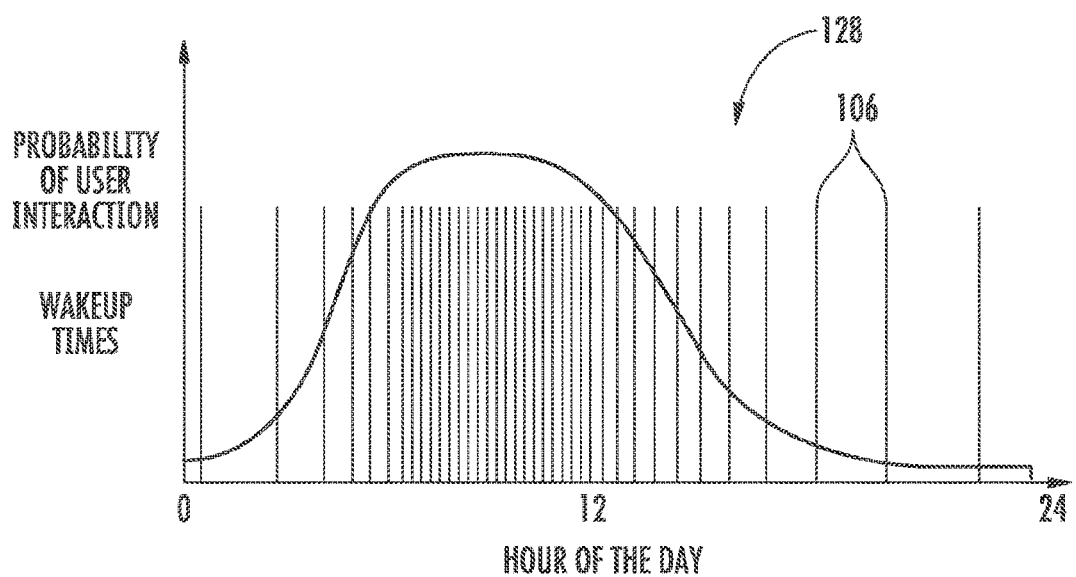
FIG. 8 is a table illustrating a model of historic communication between a control assembly and a wireless device of the event notification system of FIG. 7.

Referring to FIGS. 7 and 8, a second embodiment of a security system 20 is illustrated wherein the frequency of communication between the wireless device 22 and the control assembly 23 is dynamically configurable. For the second embodiment, the server 28, or a cloud service, may be configured to monitor and determine the most probable time that a user interfaces with the wireless device 22. The server 28 may generally develop and store model(s) 128 (see FIG. 8) associated with user habits and interaction history. As a result, the wireless device 22 wakeup interval may be dynamically adapted according to the learnt user habits indicated by the server 28, which will maximize energy savings and minimize impact of long latencies. Moreover, such usage probabilities may be used to enable/disable other subsystems and/or devices of the security system 20.

In one example, model 128 may contain a probability of user interaction 130 that may resemble a bell curve. The greater the probability of user interaction, the greater is the frequency of communication between the control assembly 23 and the wireless device 22.

The model 128 may be developed using statistical and probability inferences (i.e., Markov chains, statistical regression, and others), or machine-learning techniques (i.e., neural networks, support vector machines, and others). The model 128 may generally find a correlation in any information that may affect the probability of activation, including, but not limited to, user presence, time of the day, state of the system, weather forecasts, and others. The model 128 may get updated regularly with new data learned through the interactions with the system. The model 128 may get initialized with default values established through reasonable assumptions. If desirable, the calculations and the learning of the probability model 128 may be performed in a separate, non-low-power system or device rather than the cloud 30, the mobile device or application 26, or controller 28, which may communicate the results back to the wireless device 22 or cloud 30.

Advantages and benefits of the security system 20 with configurable frequencies of communication between the control assembly 23 and the wireless device 22 includes a method of operation having lower command latencies than more tradition systems. Other advantages include an improved user experience with quicker arming capability, an extension of battery life of the wireless device 22 (i.e., longer sleep intervals when armed), and a reduction in network traffic (i.e., a reduction in packet exchanges).

Server Initiated, Non-Beacon-Tracking, Wireless, Communication System

Figure 9:
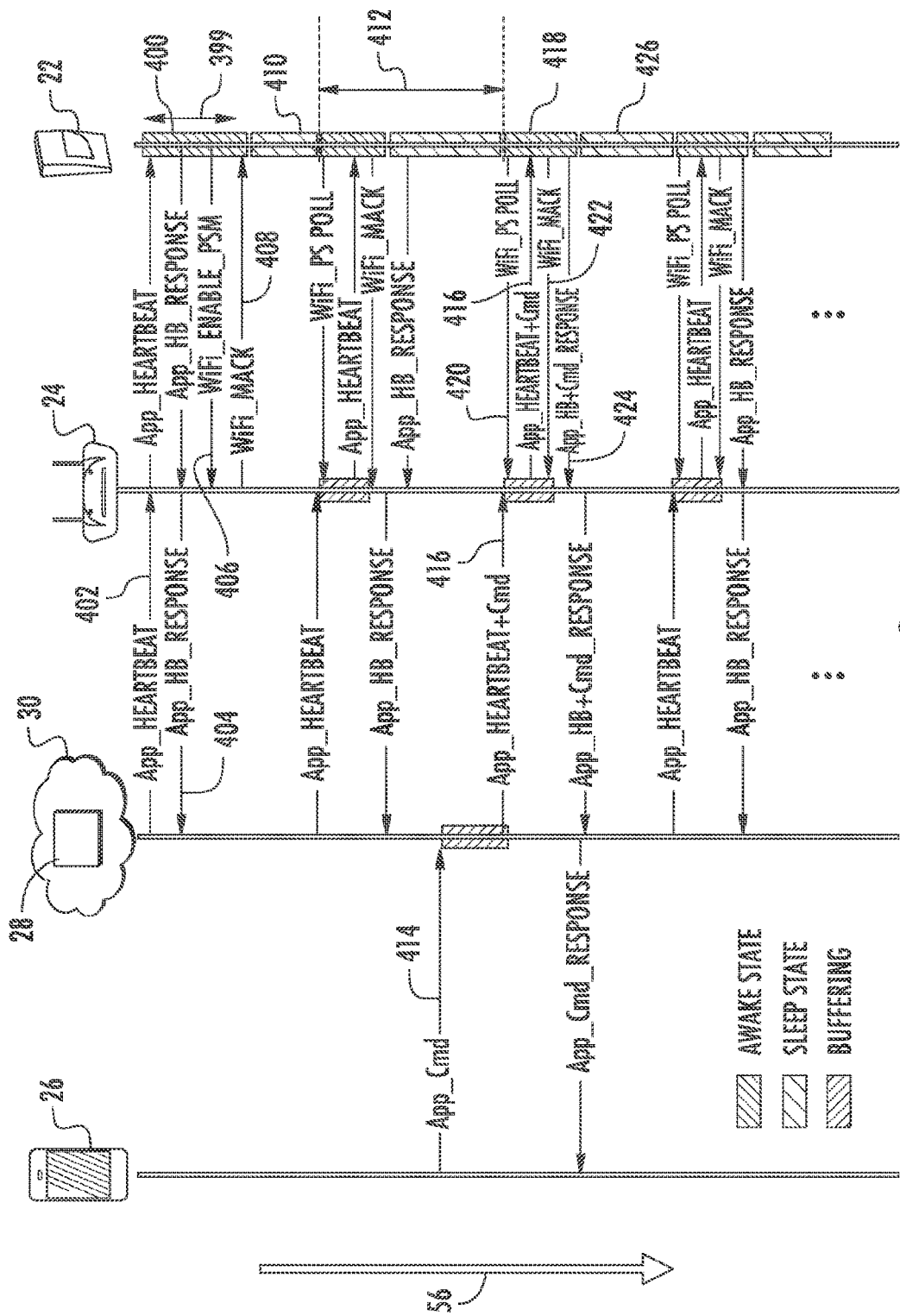
FIG. 9 is a schematic of a "server initiated, non-beacon-tracking, wireless, communication system" as a second embodiment of the wireless communication system.

Referring to FIG. 9, a schematic generally outlining another embodiment of communications between the wireless device 22, the AP device 24, the server 28 (i.e., and/or cloud 30), and the mobile application 26 along a timeline (see arrow 56) is provided. This particular string of communications generally depicts a process wherein energy consumption in Wi-Fi PSM devices 22 may be reduced by eliminating the need of sending heartbeats from the PSM devices 22, and eliminating the tracking of AP beacons, by synchronizing the waking (i.e., entering of the awake state) of the PSM device 22 with cloud 30 initiated requests.

The server 28 may generate a server heartbeat. Attached to the server heartbeat may be a heartbeat interval and any variety of commands for the PSM device 22. In operation, the PSM device 22 will wake up, receive the server heartbeat(s), respond to any commands/requests as part of the heartbeat, and return to a sleep state until expiration of the heartbeat interval 402 as part of the previously sent heartbeat. In case synchronization with the server 28 is lost, the PSM device 22 may remain awake until the next heartbeat (i.e., a full server heartbeat interval) to re-synchronize with the server 28.

More specifically, a wireless communication process may begin with a synchronization phase (see arrow 399) while in an initial awake state 400, wherein the server 28 sends a synchronizing heartbeat 402 through the AP device 24, and to the wireless device 22. The wireless device 22 may then send a synchronizing heartbeat response 404, through the AP device 24, and to the server 28. Also during the synchronization phase 399 and while in the initial awake state 400, the wireless device 22 may send a Wi-Fi enable PSM signal 406 to the AP device 24, and may receive an ACK 408 from the AP device 24 in response. Upon receiving the ACK 408, the wireless device 22 may enter a sleep state 410. The synchronizing heartbeat 402 may contain information relative to a heartbeat interval (see arrow 412) that represents a duration measured from the instant the wireless device 22 enters an awake state and to the end of the next sleep state.

Figure 10A:
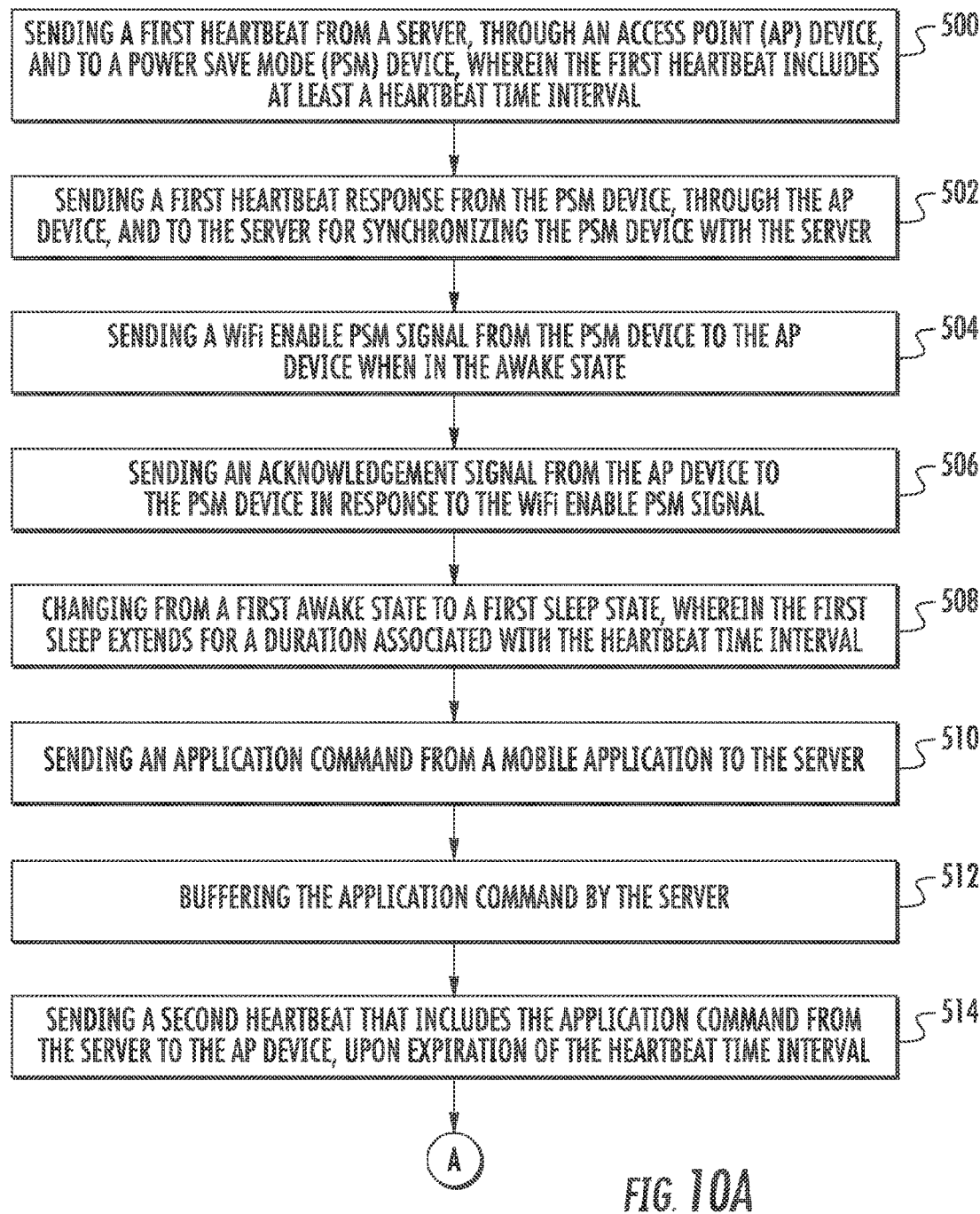
FIGS. 10A and 10B represent a flow chart illustrating a method of operating the "server initiated, non-beacon-tracking, wireless, communication system."
Figure 10B:
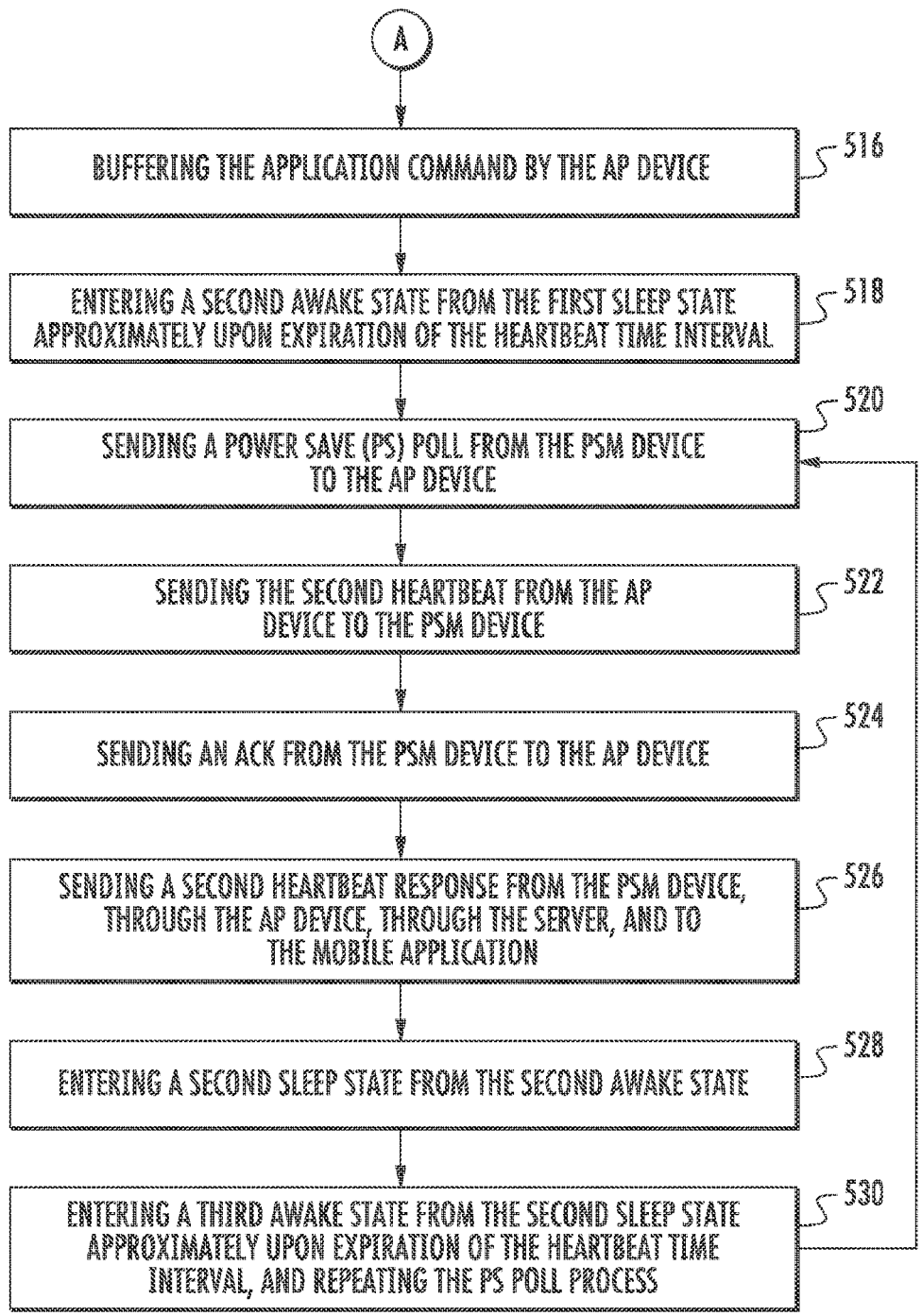

Referring to FIGS. 9, 10A and 10B, a method of operating the "server initiated, non-beacon-tracking, wireless, communication system" 20 is generally illustrated. At block 500, the synchronizing heartbeat 402 may be sent from the server 28, through the AP device 24, and to the wireless device 22 (e.g., PSM device). The synchronizing heartbeat 402 includes information relative to the heartbeat time interval 402 and thus instructs the wireless device 22 when to awake. At block 502, the first heartbeat response 404 is sent from the PSM device 22, through the AP device 24, and to the server 28 (i.e., and/or cloud 30) for synchronizing the PSM device with the server.

At block 504, the Wi-Fi Enable PSM signal 406 is sent from the PSM device 22 to the AP device 24 when in the awake state 400. At block 506, the ACK signal 408 is sent from the AP device 24 to the PSM device 22 in response to the Wi-Fi Enable PSM signal 406. At block 508, the PSM device 22 enters a first sleep state 410 from the first awake state 400. The summation of the durations of first awake state 400 and the first sleep state 410 is about equal to the heartbeat interval 412, in an example where the awake state begins when the heartbeat is received.

At block 510 and during normal operation, an application command 414 is sent from the mobile application 26 to the server 28. At block 512, the application command 414 may be buffered by the server 28 until the coinciding heartbeat interval 412 has expired. At block 514 and upon expiration of relevant heartbeat interval 412, the buffered application command 414 is advance to the AP device 24 via a second heartbeat 416 sent upon expiration of the coinciding heartbeat interval 412 and initialization of the next interval. At block 516, the second heartbeat 416, and thus the application command 414, may be buffered by the AP device 24. It is contemplated and understood that AP buffering of the heartbeat 416 may not occur, or may be generally short. However, this AP buffering capability provides a degree of system tolerance if the wireless device 22 is not exactly synchronized to the server 28, or to some degree becomes unsynchronized.

At block 518, the wireless device 22 may enter into a second awake state 418 from a previous sleep state, and approximately upon expiration of the coinciding/associated heartbeat time interval 412. At block 520, a Power Save (PS) poll 420 may be sent from the PSM device 22 to the AP device 24. At block 522, the second heartbeat 416 may be sent from the AP device 24 to the PSM device 22. At block 524, an ACK 422 may be sent from the PSM device 22 to the AP device 24. At block 526, a second heartbeat response 424 may be sent from the PSM device 22, through the AP device 24, through the server 28, and to the mobile application 26. At block 528, the PSM device 22 enters a second sleep state 426 from the second awake state 418. At block 530, the PSM device 22 enters a third awake state 428 from the second sleep state 426 approximately upon expiration of the associated heartbeat interval 412, and the PS poll process generally repeats itself.

Benefits and advantages of the "cloud initiated, non-beacon-tracking, wireless, communication system" may include the ability of PSM devices 22 to ignore the AP device 24 beacons, and the extension of time that PSM devices may stay in the sleep state without dropping packets. Other advantages include a non-beacon-tracking method of operation that is more efficient than tradition Wi-Fi PSM because the PSM device 22 does not need to wake up to track beacons, thus the PSM device may sleep for longer time intervals (i.e., up to AP disassociation time). Server synchronization may permit message exchange to start on the server 28 side, reducing the time the device 22 must be active due to the heartbeat generation and uplink latency 68. Moreover, the implementation of this method in a multicore system (i.e., one processor for Wi-Fi communications and another for the application), may become even more efficient since the application core does not need to be woken up if commands are not received by the Wi-Fi core.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of operating an event notification system comprising:
    sending a disable command from a user application to a controller;
    sending an effective disabled response from the controller to the user application in response to the disable command; and
    buffering the disable command by the controller.

2. The method set forth in claim 1, wherein the controller is a virtual panel that is part of a cloud server.

3. The method set forth in claim 1, further comprising:
    sending an event condition from a Power Save Mode (PSM) device, through an Access Point (AP) device, and to the controller;
    suppressing the event condition at the controller while the disable command is buffered; and
    sending the buffered disable command from the controller, through the AP device, and to the PSM device in response to receipt of the event condition.

4. The method set forth in claim 3, further comprising:
    sending an enable command from the user application to the controller;
    buffering the enable command by the controller;
    sending a heartbeat from the PSM device, through the AP device, and to the controller;
    sending a heartbeat response from the controller, through the AP device, and to the PSM device, wherein the heartbeat response includes the enable command and is in response to the heartbeat.

5. The method set forth in claim 4, further comprising:
    enabling the PSM device after receiving the heartbeat response; and
    sending an enabled confirmation signal from the PSM device, through the controller, and to the user application.

6. The method set forth in claim 5, wherein the AP device is a router.

7. The method set forth in claim 5, wherein the user application is a smart phone.

8. The method set forth in claim 5, wherein the event notification system is a security system, enable command is an arm command, and the disable command is a disarm command.

* * * * *